Patented June 15, 1954

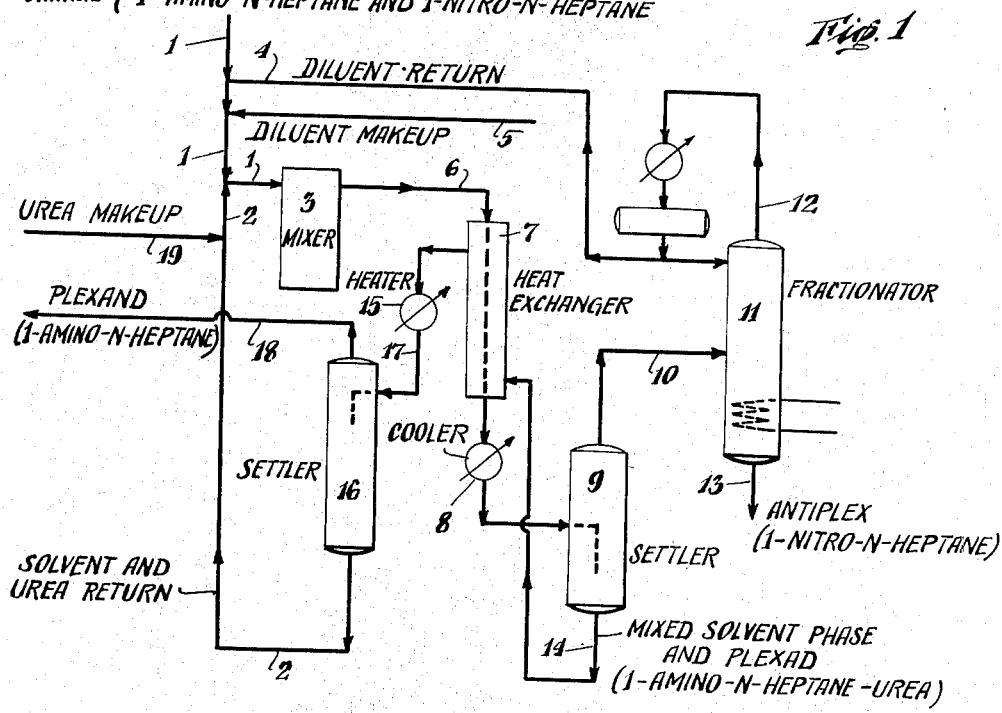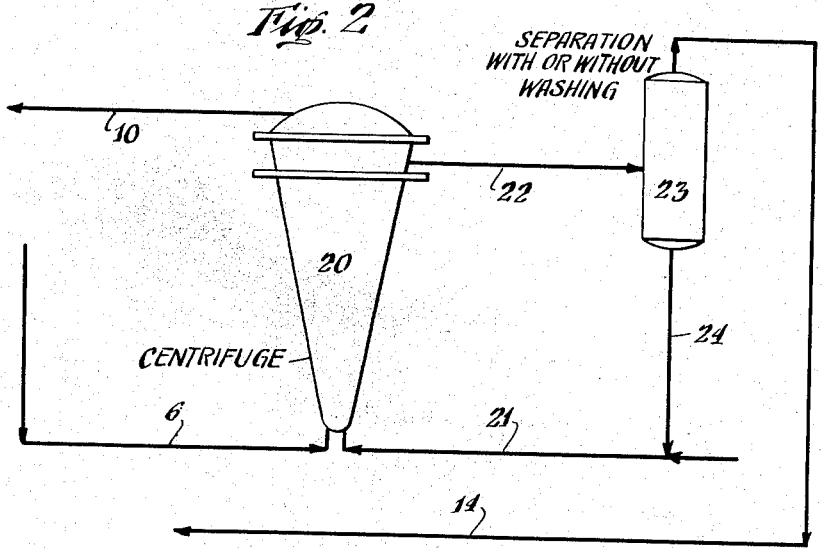

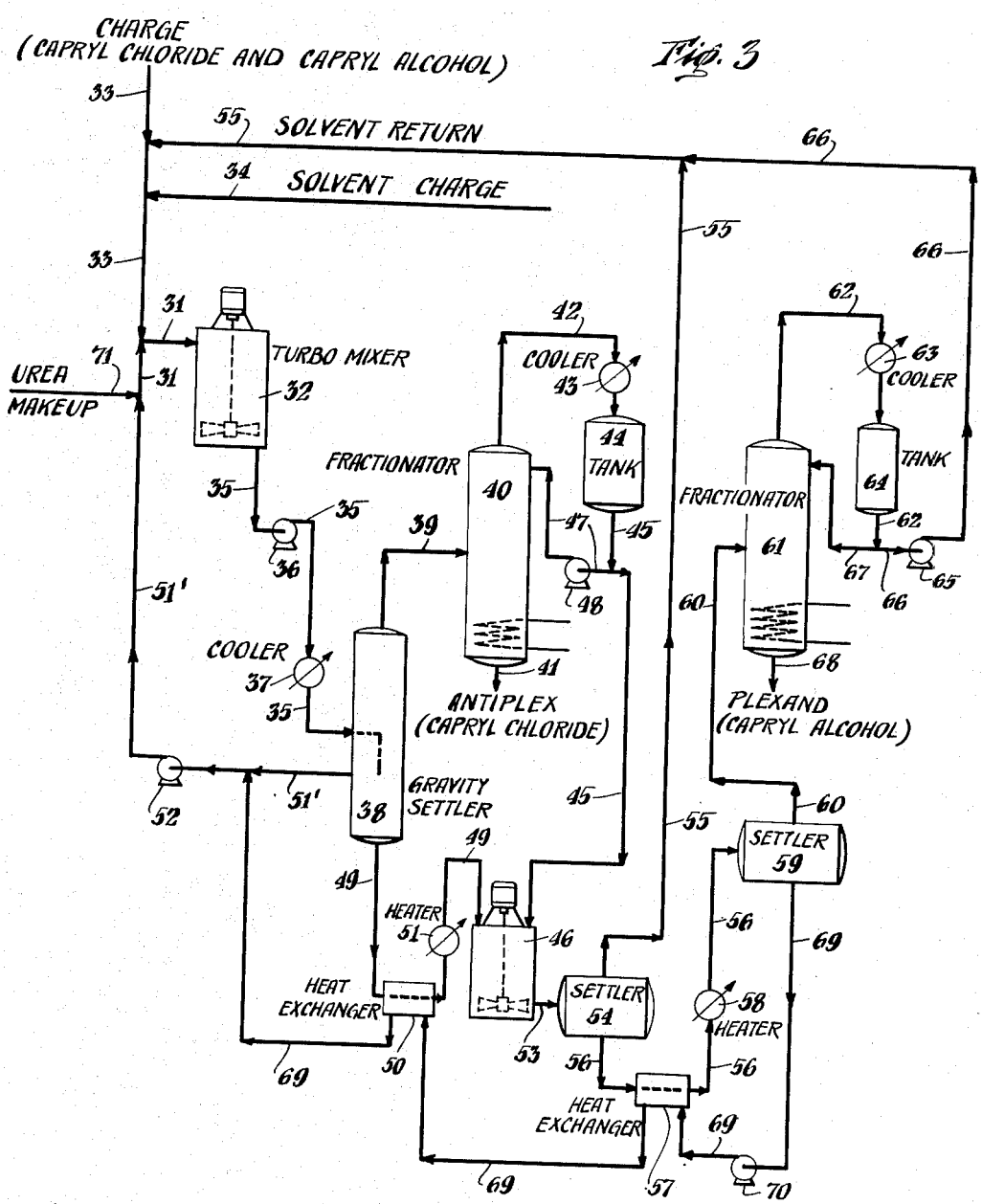

2,681,333

UNITED STATES PATENT OFFICE 2,681,333

SEPARATION OF HYDROCARBONS AND HYDROCARBON DERIVATIVES

Everett Gorin, Castle Shannon, Pa., assignor to Socony-Vacuum Oil Company, Incorporated, a corporation of New York Application September 13, 1949, Serial No. 115,517

7 Claims. (Cl. 260—96.5)

This invention has to do with the separation of hydrocarbons and hydrocarbon derivatives of similar molecular configuration from mixtures containing the same.

I. FIELD OF INVENTION

Numerous processes have been developed for the separation of hydrocarbons and hydrocarbon derivatives of different molecular configuration by taking advantage of their selective solubility in selected reagents or solvents from which they may later be separated. Exemplary of hydrocarbon separation procedures is the Edeleanu process, wherein paraffinic materials are separated from aromatics by virtue of the greater solubility of aromatics in liquid sulfur dioxide. Lubricant oil solvent refining processes, solvent deasphalting, solvent dewaxing and the like are further examples of the separation of hydrocarbons of different molecular configuration. Typical of selective solvent procedures for separating hydrocarbon derivatives is the separation of paraffin wax, monochlorwax and polychlorwaxes, with acetone as the selective solvent.

This invention is concerned with the general field outlined above, but based upon a different and little-known phenomenon, namely, the differing ability of hydrocarbons and hydrocarbon derivatives to enter into and to be removed from certain crystalline complexes. As used herein, the term "complex" broadly denotes a combination of two or more compounds.

This invention is predicated upon the knowledge that urea forms complex crystalline compounds to a varying degree with various forms of hydrocarbons and hydrocarbon derivatives.

II. PRIOR ART

For some years it has been known that various isomers of aromatic hydrocarbon derivatives form complexes with urea. Kremann (Monatshefte f. Chemie 28, 1125 (1907)) observed that complexes, designated as "double compounds," of urea and the isomeric cresols are stable at different temperatures. Schotte and Priewe (1,830,859) later separated meta-cresol from the corresponding para isomer by selectively forming a meta-cresol-urea complex, which was described as an "addition compound"; the latter compound was separated from the para isomer and then split up by distillation or with water or acid to obtain pure meta-cresol. The "addition compound" of meta-cresol and urea was shown thereafter to have utility as a disinfectant (Priewe, 1,933,757). Bentley and Catlow (1,980,901) found a number of aromatic amines containing at least one basic amino group capable of forming "double compounds" with certain isomeric phenols. It has also been shown that trans-oestradiol can be separated from the corresponding cis-compound by forming a difficultly soluble compound of urea and trans-oestradiol (Priewe, 2,300,134).

The forces between urea and the compounds of the foregoing complexes are due to specific chemical interaction between the functional groups.

One heterocyclic compound, 2:6 lutidine, has been found to form a crystalline compound with urea, thus affording a means of separating the lutidine from beta- and gamma-picolines (Riethof—2,295,606).

Comparatively few aliphatic hydrocarbon derivatives have been known to date to form complex compounds with urea. In German patent application B 190,197, IVd/12 (Technical Oil Mission, Reel 143; Library of Congress, May 22, 1946), Bengen described a method for the separation of aliphatic oxygen-containing compounds (acids, alcohols, aldehydes, esters and ketones) and of straight chain hydrocarbons of at least six carbon atoms from mixtures containing the same, the method being predicated upon the ability of such compounds and hydrocarbons to form "additions—Produkt" with urea. In the Technical Oil Mission translation of the Bengen application, however, the urea complexes were designated "adducts," which term apparently stems from the anglicized "addition product."

III. DEFINITIONS

From the foregoing discussion of prior art (II), it will be clear that a variety of terms have been applied to urea complexes. The latter have been rather loosely described as "double compounds," "addition compounds," "difficulty soluble compounds," "Additions—Produkt," and "adducts." All of these terms are somewhat ambiguous in that they have also been used to describe products or complexes of different character than the urea complexes under consideration. This is particularly so with the term "adduct," and the related term "unadducted material." While the term "adduct" is simple and convenient, it is an unfortunate designation, inasmuch as it confuses these complexes with other substances known in the chemical art. Specifically, "adduct" has been applied to Diels-Alder reaction products, formed by reaction of conjugated diolefins and olefins and their derivatives. As is well known, Diels-Alder products, as a rule do not revert to their original constituents when heated or treated with water, acids, solvents, etc. Moreover, the term "adduct" has been defined earlier as "The product of a reaction between molecules, which occurs in such a way that the original molecules or their residues have their long axes parallel to one another." (Concise Chemical and Technical Dictionary.) Further ambiguity is introduced by the term "adduction," which has been defined as "oxidation." (Hackh.)

To avoid the foregoing conflicting terminology, several related terms have been coined to define with greater specificity the substances involved in the phenomenon under consideration. As contemplated herein and as used throughout the specification and appended claims, the following terms identify the phenomenon:

Plexad—a revertable associated complex comprising a plexor, such as urea, and at least one other compound; said plexad characterized by reverting or decomposing, under the influence of heat and/or various solvents, to its original constituents, namely, a plexor and at least one plexand;

Plexand—a compound capable of forming a plexad with a plexor, such as urea; compounds of this character differ in their capacity to form plexads, depending upon various factors described hereinafter;

Antiplex—a compound incapable of forming a plexad with a plexor;

Plexor—a compound capable of forming a plexad with a plexand; such as urea.

Plexation—the act, process or effect of plexating.

IV. OUTLINE OF INVENTION

It has now been discovered that, by selective plexation with urea, a terminally-substituted straight chain compound (I) can be separated in the form of a plexad, from a mixture containing the same and another terminally-substituted straight chain compound (II), the latter containing a different terminal substituent than (I) and containing the same number of carbon atoms in the chain as (I). As explained in detail hereinafter, the "width" of the terminal substituent of (I) is less than the "width" of the terminal substituent of (II). Selective plexation is also effective in many instances when the terminal substituents are different, and the number of carbon atoms of the substituted paraffins are different.

Correspondingly, it has also been discovered that, by selective plexation with urea, a non-terminally-substituted straight chain compound (III) can be separated, in the form of a plexad, from a mixture containing the same and another non-terminally-substituted straight chain compound (IV), the latter containing a different non-terminal substituent than (III), the substituent being in the same positional relationship as in (III), and containing the same number of carbon atoms in the chain as (III). In this instance, the "length" of the substituent of (III) is less than the "length" of the substituent of (IV). Selective plexation is also generally effective when the terminal substituents are different, and the positional relationship of the non-terminal substituents and/or the number of carbon atoms of the compounds are different.

A further discovery resides in selective plexation of non-terminally-substituted straight chain paraffin isomers, the isomer having the substituent joined to a more centrally positioned carbon atom of the chain being less susceptible to plexation.

As contemplated herein, the invention makes possible the separation of one or more plexands from a mixture containing the same, such plexand or plexands being separated in the form of a plexad or plexads which, as described in detail hereinbelow, revert to the plexor, urea, and the plexand or plexands under certain conditions. The separation, therefore, is an excellent means for obtaining, in pure or concentrated form, one or more plexands or antiplexes whichever is the desired material. The invention also provides a means of forming new compositions of matter, namely, a number of plexads which may be used as a source of a plexor, urea, or as a source of a plexand.

V. OBJECTS

It is an object, therefore, to provide an effective means for separating hydrocarbons and hydrocarbon derivatives of different molecular configuration from mixtures containing the same.

It is also an object of this invention to selectively separate terminally-substituted straight chain compounds from mixtures containing the same and other terminally-substituted straight chain compounds.

A further object is to selectively separate non-terminally-substituted straight chain compounds from mixtures containing the same and other non-terminally-substituted straight chain compounds.

Still another object is to selectively separate non-terminally-substituted straight chain paraffin isomers from mixtures thereof.

Other objects and advantages of the invention will be apparent from the following description.

VI. INVENTION IN DETAIL

As indicated above, it has been found that the foregoing objects are achieved by selective plexation with urea (a plexor), of a plexand or plexands.

Terminally-substituted straight chain compounds as contemplated herein may be represented by general Formula A:

(A) 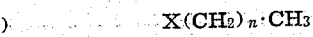   $X(CH_2)_n \cdot CH_3$ wherein $n$ is a whole number and wherein X is a substituent group of the character described below, with $n$ and X being interrelated.

The terminal substituent group X can be an inorganic or organic group, such as illustrated by the following:

(a) Halogen:
  F, Cl, Br and I
(b) Nitrogen-containing:
  $NH_2$, $NH(R)$, $NR_2$, $NO_2$, NOH, CN, $CONH_2$, CONH(R), $CON(R)_2$, CNO, CNS, NCO, NCS, etc., wherein R is a hydrocarbon radical.
(c) Sulfur-containing:
  SH, SR, $SO_3H$, $OSO_3H$, $SO_2H$, $SO_2R$, SOR wherein R is a hydrocarbon radical, $SO_2Z$ wherein Z is a halogen atom, etc.
(d) Oxygen-containing:
  OH, CHO, COOH, COOR wherein R is a hydrocarbon group, C=O, —O—, $CH_2OH$, $CH_2COOH$, etc.

(e) Cyclic:
  Cycloalkyl such as cyclopropyl, cyclobutyl, cyclopentyl, cyclohexyl, cycloheptyl, chlorcyclohexyl, etc.; aryl such as phenyl and chlorphenyl; hetero such as thienyl $C_4H_3S$, furyl $C_4H_3O$, pyrryl $C_4H_4N$, pyridyl $C_5H_4N$, thiazyl $C_3H_2NS$, pyrazolyl $C_3H_3N_2$, piperydyl $C_5H_{10}N$, etc.;
(f) Alkyl:
  Methyl
(g) Alkenyl:
  Vinyl
(h) Haloalkyl:
  Dichlormethyl $Cl_2CH-$, etc.

The substituent group (X) can be any of the types outlined above subject however, to one important consideration, namely, that of geometrical size. As indicated above, the "width" of the terminal substituent group (X) is of importance in the selective plexation of terminally substituted compounds represented by general Formula A, above. The "width" is the cross-section of the group (X) taken in a direction perpendicular to the bond joining the group (X) to the parent hydrocarbon. This distance is taken at the widest portion of the group and may be conveniently given a quantitative measure as the distance from between outer covalent radii of the two most widely separated atoms along the cross-section of the group where the covalent radii are those given by Pauling (Pauling—"Nature of The Chemical Bond"; Cornell University Press; Ithaca, N. Y.; 1939). The "width" determines the length of the aliphatic chain required to obtain plexation at room temperature (about 25° C.) with a saturated urea solution, a plexor, when the group (X) in question is attached to the terminal carbon atom of the aliphatic chain. In the case of composite groups of the type —COY, —$CH_2$COY and —$CH_2$Y, where Y is a non-aliphatic radical such as chlorine or amino, the =CO, —$CH_2$CO and —$CH_2$— constituents, respectively, are considered as part of the aliphatic chain and the "width" computed is that for the radical Y.

The "widths" of a number of typical groups computed according to the method given above are listed in order of size in Table I below:

TABLE I.—"WIDTH" OF VARIOUS GROUPS IN A°

| Group | Width |
|---|---|
| —CN | 1.20 |
| —F | 1.28 |
| —OH | 1.93 |
| —COOH | 1.93 |
| —Cl | 1.98 |
| —$NH_2$ | 2.11 |
| —$CONH_2$ | 2.11 |
| —Br | 2.28 |
| —$CH_3$ | 2.36 |
| —I | 2.66 |
| —SH | 2.67 |
| —$NO_2$ | 3.32 |
| —$SO_3H$ | 3.69 |
| Thienyl | 4.38 |
| Cyclohexyl | 4.74 |
| Phenyl | 5.15 |
| 2 or 3 methyl cyclohexyl | 5.49 |
| O- or M-tolyl | 6.09 |

The correlation between the "width" of the group and the length of the aliphatic chain required for plexad formation at 25° C. is an approximate one. This relationship depends to some extent upon the nature of the group (X) as well as upon the "width" of the group (X). For example, in the case where two groups (X) are of the same size, the group which imparts a higher melting point to the substituted paraffin will form the stronger plexad, i. e., will form a plexad when the aliphatic chain is somewhat shorter in length. Caproic acid, melting point —1.5° C., thus forms a plexad with saturated urea at 25° C., whereas n-hexyl alcohol, melting point 51.6° C. does not, even though in both cases the substituent groups, —COOH and —OH, respectively, are of the same width in compounds having the same carbon chain length.

Only the carbon atoms in the chain are considered to contribute to the chain length, that is, atoms such as oxygen, sulfur, nitrogen, etc., are not included in the atom total. Accordingly, then, the straight chain compounds contemplated herein include straight chain aliphatic hydrocarbons and straight chain aliphatic hydrocarbons in which one or more of the carbon atoms of the chain have been replaced by such atoms as oxygen, sulfur, nitrogen, and the like.

It is possible, however, to give the unequivocal limits for the relation between "width" of the group (X) and size of the carbon chain required for plexation with urea at 25° C. These limits are set forth in Table II below:

TABLE II.—CORRELATION BETWEEN "WIDTH" OF GROUP (X) AND MINIMUM CHAIN LENGTH FOR UREA PLEXATION AT 25° C.

| Group | "Width" (in Å) | Minimum Chain Length, Number of Carbon Atoms |
|---|---|---|
| 1 | <2.3 | 5–8 |
| 2 | 2.3–3.7 | 8–12 |
| 3 | 3.7–5.2 | 12–18 |
| 4 | >5.2 | >18 |

It is to be understood that these limits apply for plexation at temperatures of the order of about 25° C. The minimum number of carbon atoms in the chain is generally lower for plexation at lower temperatures, but generally not more than one or two carbon atoms lower. In the same vein, for an increase in temperature, a correspondingly higher number of carbon atoms will be required in the carbon chain.

To illustrate the application of the data shown in Tables I and II, with a mixture of a terminally-substituted straight chain amine and a terminally-substituted straight chain nitroparaffin of equal chain length, the amine will preferentially form a plexad. This is specifically illustrated by a mixture of n-dodecyl amine ($NH_2$=2.11 A°) and 1-nitro-n-dodecane ($NO_2$=3.32 A°). Similarly, with a mixture containing a straight chain mercaptan and a straight chain sulfonic acid of equal chain length, the mercaptan and a straight chain sulfonic acid of equal chain length, the mercaptan (SH=2.67 A°), rather than the sulfonic acid ($SO_3H$=3.69 A°), will preferentially form a plexad. A specific illustration of the latter is a mixture of n-hexadecane mercaptan and n-hexadecane sulfonic acid.

By way of illustration, the following compounds are typical plexands:

(a) Halogen compounds:
  n-heptyl fluoride, n-heptyl bromide, n-octyl chloride, n-octyl bromide, n-hexadecyl chloride, n-hexadecyl bromide, n-octadecyl chloride, n-octadecyl bromide, etc.

(b) Nitrogen-containing compounds:
   amino—
      n-octylamine; n-decylamine; n-hexadecylamine; methyl, n-octyl amine; butyl, n-octyl amine; etc.
   cyano—
      n-hexyl nitrile; n-octyl nitrile; n-tetradecyl nitrile; n-octadecyl nitrile; etc.
   nitro—
      1-nitro-n-decane; 1-nitro-n-dodecane; 1-nitro-n-octodecane; etc.
   amido—
      n-octanamide; n-dodecanamide; n-octadecanamide; n-octadeceneamide; N-methyl, n-octanamide; N-hexyl, n-decanamide; etc.
   cyanate and isocyanate—
      n-hexyl cyanate; n-hexyl isocyanate; n-decyl cyanate; n-decyl isocyanate; n-hexadecyl cyanate; n-hexadecyl isocyanate; etc.
   thiocyanate and isothiocyanate—
      n-decyl thiocyanate; n-decyl isothiocyanate; n-octadecyl thiocyanate; n-octadecyl isothiocyanate; etc.
(c) Sulfur-containing compounds:
   mercapto—
      n-octyl mercaptan; n-dodecyl mercaptan; n-hexadecyl mercaptan; n-octadecenyl mercaptan; etc.
   sulfido (SR)—
      Methyl, n-octyl sulfide; n-butyl, n-dodecyl sulfide; amyl, n-hexadecyl sulfide; etc.
   sulfato—
      n-dodecyl sulfate; n-hexadecyl sulfate; etc.
   sulfonyl halide—
      n-decyl sulfonyl chloride; n-dodecyl sulfonyl bromide; n-hexadecyl sulfonyl iodide; etc.
(d) Oxygen-containing compounds:
   hydroxy—
      n-heptanol-1; n-octanol-1; n-decanol-1; n-dodecanol-1; n-hexadecanol-1; oleyl alcohol; octadecyl alcohol; etc.
   carboxyl—
      n-valeric acid; caproic acid; n-heptylic acid; caprylic acid; prelargonic acid; lauric acid; myristic acid; palmitic acid; stearic acid; arachidic acid; behenic acid; lignoceric acid; cerotic acid; delta-9,10-decylenic acid; delta-9,10-dodecylenic acid; palmitoleic acid; oleic acid; ricinoleic acid; lineleic acid; etc.
   keto—
      di(n-butyl) ketone; methyl, n-heptyl ketone; ethyl, n-hexyl ketone; etc.
   ether—
      di(n-butyl) ether; ethyl, n-pentyl ether; di(n-pentyl) ether; etc.
   ester—
      di(n-amyl) succinate; 2-ethylhexyl, n-octyl fumarate; n-butyl stearate; n-butyl oleate; di(n-hexyl) fumarate; di(n-octyl) fumarate; di(n-hexyl) maleate; di(n-octyl) maleate, etc.
(e) Cyclic substituent:
      1-cyclopropyl-n-octadecane; 1-cyclohexyl-n-hexadecane; 1-phenyl-n-octadecane; 1-thienyl-n-octadecane; etc.
(f) Alkyl substituent:
      n-octane; 2,2-dimethyl-n-octadecane; etc.
(g) Alkenyl substituent:
      n-octene-1; n-nonadecene-1; etc.
(h) Haloalkyl substituent:
      1,1-dichlormethyl-n-decane; etc.

It should be noted that 2-ethylhexyl, n-octyl fumarate forms a plexad with urea, thus demonstrating that a relatively small degree of branching can be tolerated, i. e., one ethyl group in a linear chain containing eighteen carbon atoms. However, di(2-ethylhexyl) fumarate does not form a plexad under the same conditions, apparently having too high a degree of branching.

It is to be understood that terminally-substituted straight chain compounds containing a second terminal substituent on the opposite terminal carbon atom, are also contemplated herein as plexands. Such di-substituted compounds are also subject to approximately the foregoing relationships of terminal group "width" and chain length. Compounds of this character are represented by the following general formula A':

(A')  X(CH₂)ₙX' wherein $n$ is a whole number, and X and X' are the same or different and as defined above.

Illustrative of such compounds are:

1,10-dichlor-n-decane;
1,8-n-octane diamine;
1,10-n-decane diamine;
1,12-n-dodecane dithiol;
1,18-disulfo-n-octadecane; etc.

As mentioned above, selective plexation of non-terminally-substituted straight chain paraffins is also contemplated herein. Compounds of this character have the capacity to form plexads and are considered secondary plexands. These non-terminally-substituted compounds are represented by general Formula B:

(B) 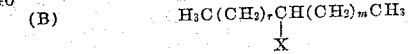 H₃C(CH₂)ᵣCH(CH₂)ₘCH₃
                              |
                              X wherein $r$ and $m$ are integers, the sum of which is equal to or other than $n-2$, and $n$ and X are as defined above.

Again, the geometrical size of the substituent group (X) is a salient consideration. With a non-terminally-substituted compound, a "length" factor is a determinant. This distance is the projection along the bond joining the group to the parent hydrocarbon of the distance from the center of the carbon atom to which the group is attached, to the center of the atom whose covalent radius shell extends furthest in the direction of said bond, plus the covalent radius of said bond. The "length" of the substituent group (X) roughly determines the minimum carbon chain length required for plexation of the foregoing plexands (B), namely, non-terminally-substituted straight chain compounds. The minimum chain length is also to some extent a function of the position substituted as well as of the chemical nature of the group. Thus, in compounds of this type, the minimum chain length required for plexation is determined by the length of group H₃C(CH₂)ᵣ—, if $r$ is small enough so that this alkyl group is shorter in "length" than the substituent group (X). It is possible, bearing this relationship in mind, however, also to give rather wide limits in the correlation of group "length" with the minimum chain length required for plexation with urea at 25° C. The "lengths" of various groups are given in Table III, while the correlation of chain lengths with group "lengths" is given in Table IV, provided below.

TABLE III.—"LENGTH" OF VARIOUS GROUPS IN A°

| Group | Length |
|---|---|
| —F | 2.06 |
| —OH | 2.10 |
| —NH$_2$ | 2.17 |
| —CH$_3$ | 2.31 |
| —CH$_2$OH | 2.43 |
| —NO$_2$ | 2.61 |
| —CHO | 2.70 |
| —Cl | 2.76 |
| —COOH | 2.81 |
| —SH | 2.85 |
| —BR | 3.05 |
| —CH$_2$Cl | 3.11 |
| —C$_2$H$_5$ | 3.19 |
| —CN | 3.25 |
| —SO$_3$H | 3.37 |
| —I | 3.43 |
| —Cyclohexyl (average configuration) | 5.09 |
| —Phenyl | 5.69 |

TABLE IV.—CORRELATION BETWEEN "LENGTH" OF NON-TERMINALLY-SUBSTITUTED GROUPS AND MINIMUM CHAIN LENGTH REQUIRED FOR UREA PLEXATION AT 25° C.

| Group | "Length" (in Å.) | Minimum Chain Length, Number of Carbon Atoms |
|---|---|---|
| 1 | <2.30 | 7–10 |
| 2 | 2.30–2.50 | 10–13 |
| 3 | 2.50–2.80 | 13–18 |
| 4 | 2.80–3.20 | 18–24 |
| 5 | >3.20 | >24 |

It is to be understood, once again, that the limits shown in Table IV apply for plexation at temperatures of about 25° C. Here too, the minimum number of carbon atoms in the chain is somewhat lower for plexation at lower temperatures, but generally not more than one or two carbon atoms lower. In the same vein, a correspondingly higher number of carbon atoms will be required in the carbon chain for a rise in temperature.

Applying the data of Tables III and IV, by way of illustration, it will be seen that a secondary alcohol of a mixture containing the same and a secondary acid of the same chain length will preferentially form a plexad. Typical of such a preferential plexation is the separation of octanol-2 from 2-methyl heptylic acid or from 2-ethyl hexanoic acid.

Representative secondary plexands are the following:

2-chloro-n-tetracosane;
2-bromo-n-tetracosane;
2-amino-n-decane;
2-nitro-n-octadecane;
methyl hexyl carbinol (n-octanol-2);
2-methyl n-hexadecane;
n-octene-2; etc.

(3) PLEXOR

The plexor used herein is urea, which is in solution in a single- or multiple-component solvent. This solution should range from partially saturated to supersaturated at the temperature at which it is a plexand or with a mixture of plexands and antiplexes, and, in many cases, it will be found convenient to suspend a further supply of urea crystals in the solution, handling it as a slurry. For gravity or centrifugal separation, it is convenient to use a solvent, of such a specific gravity that after the formation of a desired amount of plexad, the specific gravity of the solvent phase will be different from that of the plexad phase and of the antiplex phase to a degree sufficient to permit separation by gravity, centrifuging, etc.

The solvent should be substantially inert to the plexand and to the compounds of the mixture and also to the urea. Preferably, it should also be heat stable, both alone and in contact with urea, at temperatures at which the desired plexad is not heat stable.

As indicated above, the solvent may be either single- or multiple-component. It is sometimes convenient, particularly where the plexad is separated by gravity, to utilize a two-component system, as water and an alcohol, glycol, amine or diamine, and preferably a lower aliphatic alcohol such as methanol or ethanol, or a water-soluble amine such as piperidine. Such a solvent, partially saturated to supersaturated with urea, lends itself readily to a continuous process for separation by plexation.

Solutions containing sufficient water in order to minimize the solubility of the hydrocarbon derivatives in the urea solvent, are often employed. The minimum quantity of water required in such instances depends upon the polarity and the molecular weight of the hydrocarbon derivative, or plexand, being treated and, in general, this quantity will be greater with more polar plexands and lower molecular weight compounds.

In certain cases the use of single-component solvents is advantageous. Single-component solvents other than alcohols may be employed, although they are normally not as useful as the lower aliphatic alcohols. Glycols may be employed as single solvents, yet ethylene glycol is generally not suitable in gravity separation operations due to the high density of the urea-saturated solvent. The higher glycols and particularly the butylene glycols may be advantageously employed. Diamines such as diaminoethane, -propane and -butane may likewise be employed. Additional useful solvents include formic acid, acetic acid, formamide and acetonitrile, although the first three of these are subject to the same limitation as ethylene glycol.

Solvents generally useful when mixed with sufficient water, ethylene glycol or ethylene diamine, to render them substantially insoluble in the derivatives being treated, are selected from the class of alcohols such as methanol, ethanol, propanol, etc.; ethers such as ethylene glycol dimethyl ether; and amines such as triethylamine, hexylamine, piperidine. When gravity separation is employed, the mixed solvent is preferably subject to the restriction that the density after saturation with urea must be less than 1.0–1.1.

(4) TYPICAL SEPARATIONS

In order that this invention may be more readily understood, typical separations are described below with reference being made to the drawings attached hereto.

(a) *Separation of plexand from antiplex*

The procedure which may be employed in effecting the separation of a terminally-substituted straight chain hydrocarbon from a related hydrocarbon carrying a different terminal substituent may be essentially the same as that described in copending application Serial No. 4,997, filed January 29, 1948. The plexand obtained in decomposing the plexad obtained in a urea treatment of a mixture of the foregoing terminally-substituted hydrocarbons is very pure, provided the substituent group and the aliphatic chain length of one such hydrocarbon have such values that only the latter forms a plexad and provided the plexad be carefully freed of occluded antiplex before it is decomposed. For example, very pure 1-amino-n-heptane is separated from the plexad obtained in the treatment of a mixture 1-amino-n-heptane and n-nitro-n-heptane. It is more difficult, however, to obtain in one operation pure 1-amino-n-dodecane from a mixture of said amine and 1-nitro-n-dodecane; however, it is possible to obtain a more concentrated amine product in a single treatment of the mixture with urea, and a relatively pure amine with several successive treatments with urea.

In Figure 1, a charge comprising 1-amino-n-heptane and 1-nitro-n-heptane, respectively, enters through line 1, to be contacted with urea solution from line 2, and the charge and solution are intimately mixed in mixer 3. In case the charge undergoing treatment is rather viscous at the temperature of plexad (amine-urea) formation, it is advisable to provide a diluent, such as for example, a naphtha fraction which may be recycled within the process, as described later, and joins the charge from line 4. Diluent make up is provided by line 5.

From mixer 3, wherein there is achieved an intimate mixture of urea solution and charge, the mixture flows through line 6, heat exchanger 7, and cooler 8 into settler 9. There may be some or a good portion of plexad (amine-urea) formed in mixer 3, but in general, it is preferred to operate mixer 3 at a temperature somewhat above that conducive to heavy formation of plexad. Then, in heat exchanger 7, the temperature of the mixture is reduced, and in cooler 8 adjusted, so that the desired plexad is formed. It will be recognized that this showing is diagrammatic, and that the heat exchangers and coolers, heaters, etc., shown will be of any type suitable, as determined by the physical characteristics of the materials being handled.

From cooler 8, the plexad-containing mixture flows into settler 9. This settler is preferably so managed that there is an upper phase of antiplex (1-nitro-n-heptane), an intermediate phase of urea solution, and a lower region containing a slurry of plexad in the urea solution. The incoming mixture is preferably introduced into the solution phase, so that the antiplex may move upward and plexad downward, through some little distance in the solution, to permit adequate separation of plexad from antiplex and antiplex from plexad.

Antiplex will be removed from settler 9 by line 10 and introduced into fractionator 11, wherein the diluent is removed, to pass overhead by vapor line 12 and eventually to use through line 4. Recovered antiplex passes from the system through line 13. Obviously if no diluent be used, fractionator 11 will be dispensed with.

Plexad and urea solution, withdrawn from settler 9 through line 14 are passed through heat exchanger 7 and heater 15 to enter settler 16 through line 17. In this operation, the temperature is so adjusted that the plexand (amine) is freed from the plexad, and in settler 16, the plexand rises to the top to be recovered from the system by means of line 18. The urea solution, thus reconstituted to its original condition by return to it of that portion of the urea which passed into plexad, is withdrawn from settler 16 by line 2 and returned to process. Naturally, in a process of this kind there are minor mechanical and entrainment losses of urea solution, etc., and urea solution makeup is provided for by line 19.

In many cases, the separation of plexad and solution from antiplex may be conducted with greater facility in a centrifuge operation. Such a set up is shown in Figure 2, wherein only the equivalent of that portion of Figure 1 centering about settler 9 is reproduced. Again, in diagram form, the cooled mixture containing antiplex, plexad and urea solution enters centrifuge 20 through line 6. In many cases it will be desirable to utilize a carrier liquid in known manner in this operation and that liquid may be introduced by line 21. Antiplex will be carried off through line 10, and plexad, urea solution, and carrier, if present, pass through line 22 to a separation step, which may include washing and may be carried out in a settler, a filter, or another centrifugal operation, which separation is indicated diagrammatically at 23. Carrier liquids, if used, returns through line 24, and urea solution and plexand pass through line 14. (Note: lines 6, 10 and 14 are the same lines, for the same functions, as in Figure 1 and are identically numbered).

(b) *separation of one plexand from a second plexand*

In the case where both terminally-substituted compounds, or both non-terminally-substituted compounds, form plexads a concentration of one of such compounds will be obtained. The sharpness of separation of the compounds will be greater, the greater the difference in the strength of the plexads formed with the two pure compounds subject to plexation. In general, this will be greater, the shorter the carbon chain length of the parent hydrocarbon. For example, relatively pure capryl alcohol may be obtained from a mixture with capryl chloride in a single plexation. It is more difficult, however, to obtain separation between lauryl alcohol and lauryl chloride.

The following serves to illustrate a procedure for obtaining sharp separation between one plexand, capryl alcohol, and a second plexand, capryl chloride. This procedure is similar to a sweating or a solvent sweating procedure used in the refining of slack waxes, and is shown diagrammatically in Figure 3.

In Figure 3, a slurry of solid urea in a saturated urea solvent, which is preferably an aqueous alcoholic solution, is pumped from line 31 into a turbo mixer 32 where it is agitated with a mixture of capryl alcohol and capryl chloride, the mixture entering through line 33. [An immiscible solvent charged through line 34 is also preferably employed, such as a light cut from a straight run naphtha in case the plexands or plexand and antiplex have: (1) a relatively high viscosity; (2) an appreciable solubility in the urea solvent; or (3) greater density than the urea solvent.] The amount of excess solid urea used should be sufficient so that after plexation is completed the urea solvent remains substantially saturated with urea.

Internal cooling means may be employed in 32 to further cool the mixture and remove the heat evolved during the plexation. The temperature employed in 32 will depend upon the chain length of the plexands or plexand and antiplex. If the chain length is such that it is not more than one or two carbon atoms greater than the minimum required to obtain plexation with the pure plexand at room temperature, then temperatures in the range of −10 to 20° C. should be employed. If the chain length is from two to six carbon atoms greater than the minimum, temperatures in the range of 15–30° C. should be used; and if the chain length is greater than six carbon atoms beyond the minimum, temperatures from 25–50° C. may be employed. It will be apparent, then, that conditions of operations vary considerably, conditions selected being those appropriate for the formation of the desired plexad or plexads.

The slurry of plexad, predominantly capryl alcohol-urea, urea solvent and capryl chloride is pumped, by means of pump 36, through line 35 and cooler 37 wherein it may be further cooled if desired, and into gravity settler 38. In settler 38, capryl chloride plus naphtha solvent rises to the top and is withdrawn through line 39 into fractionator 40. Capryl chloride is removed as bottoms from the fractionator 40 through line 41. The naphtha solvent is taken from fractionator 40 through line 42, cooler 43 tank 44 and line 45 to be employed in solvent sweating zone 46. Naphtha solvent may also be recycled to fractionator 40 through line 47, by means of pump 48.

In settler 38, the slurry of plexad, in urea solvent is taken off through line 49, heat exchanger 50 and heater 51 into solvent sweating zone (or mixer) 46. A portion of the clear urea solvent may be removed from the center of settler 38 and recycled, through line 51 and pump 52, to mixer 32 if desired.

It is to be understood that the gravity settler 38 may be replaced by other separation means such as a centrifuge or rotary filter, etc.

The mixture of solvent and plexad, predominantly caprylic alcohol-urea, is heated in solvent sweating zone 46 to a temperature sufficient to decompose the major portion of the plexad of the capryl chloride, while preserving the major portion of the plexad of capryl alchol. The temperature employed in zone 46 is related to that employed in mixer 32, and will generally be maintained 10–20° C. higher in zone 41 than in mixer 32.

The partially decomposed plexads, urea solvent, and naphtha mixture are passed from zone 46 through line 53 to settler 54. The naphtha containing capryl alcohol and some capryl chloride is recycled through lines 55 and 33 to mixer 32. The slurry of undecomposed capryl alcohol-urea plexad is withdrawn from the bottom of settler 54 through line 56, heat exchanger 57, heater 58 into settler 59. The plexad is thus heated hot enough to cause complete decomposition or reversion of the plexads and solution of the urea in the urea solvent. Temperatures in the range of 55–85° C. are generally suitable.

Capryl alcohol, contaminated with naphtha which had been occluded on the corresponding plexad (capryl alcohol-urea), is withdrawn through line 60 into fractionator 61. Naphtha is taken off overhead from fractionator 61 through line 62, cooler 63, tank 64, pump 65, lines 66 and 55, to mixer 31. A portion of the naphtha may also be recycled to fractionator 61 through line 67. Capryl alcohol is recovered as bottoms through line 68.

Urea solution is recycled from the bottom of settler 59 through line 69, pump 70, heat exchangers 57 and 50, and line 51. Urea make up, to replace any losses, is provided by means of line 71.

Plexand, as capryl alcohol, of any desired purity may be obtained by either: (1) increasing the fraction of the total plexad decomposed in the solvent sweating zone (46), or (2) including a multiplicity of alternating solvent sweating zones (46) and settling zones (54) operated in series.

VII. ILLUSTRATIVE EXAMPLES

The following examples serve to illustrate, and not in any sense limit, the present invention.

A number of terminally-substituted straight chain paraffins, and non-terminally-substituted straight chain paraffins, of varying chain length were agitated for several hours with water or with aqueous methanol solutions saturated with urea, and plexad formation was evidenced by resulting precipitate. The results are summarized in Table V, below, and the minimum chain length required for plexation found experimentally is compared with the correlations given in Tables II and IV. Table V is as follows:

TABLE V.—COMPARISON OF MINIMUM CHAIN LENGTHS REQUIRED FOR UREA PLEXATION AT 25° C. FOR SUBSTITUTED PARAFFINS DETERMINED EXPERIMENTALLY WITH THOSE GIVEN IN TABLES II AND IV

PLEXAD FORMATION—ALIPHATIC CHAIN LENGTH

| Group | 4 | 5 | 6 | 7 | 8 | 10 | 12 | 16 | 18 | Group No. | Minimum Chain Length Correlation, Table II or IV |
|---|---|---|---|---|---|---|---|---|---|---|---|
| | | | | Terminal-Substituent | | | | | | | Table II |
| COOH | No | Yes | Yes | | Yes | | | Yes | Yes | 1 | 5–8 |
| CONH₂ | No | | | | Yes | | | | | 1 | 5–8 |
| OH | No | No | No | Yes | Yes | | | Yes | | 1 | 5–8 |
| Cl | No | No | | Yes | Yes | Yes | Yes | Yes | | 1 | 5–8 |
| Br | No | | | | Yes | | | Yes | Yes | 1 | 5–8 |
| CN | | | | Yes | Yes | | | Yes | Yes | 1 | 5–8 |
| NH₂ | | | | | Yes | | | Yes | Yes | 1 | 5–8 |
| Thienyl | | | | | | | | Yes | Yes | 1 | 5–8 |
| | | | | | | | | No | Yes | 3 | 12–18 |
| | | | | Non-Terminal Substituent | | | | | | | Table IV |
| OH | | | | No | Yes | | | | | 1 | 7–10 |
| CH₂OH | | | | No | | | | | | 2 | 10–13 |
| Cl | | | | | No | | | | | 3 | 13–18 |
| Br | | | | | No | | | | | 4 | 18–24 |
| COOH | | | | No | | | | | | 4 | 18–24 |

It will be noted from the data set forth in Table V that in all instances, experimental values found for the minimum chain length are within the limits recited in Tables II and IV. It will also be noted that although the "widths" of the —COOH and —OH groups are identical, in the former case (—COOH) plexation begins with valeric acid (5 carbons), while heptanol-1 (7 carbons) is the first alcohol to plexate in the latter case. As indicated earlier, however, when a n-acid and a n-alcohol of equal chain length and each capable of plexation, are in admixture and contacted with urea solution, the acid—of higher melting point—will preferentially form a plexad. For example, the melting point of caprylic acid is +16° C. as compared with −16° C. for capryl alcohol.

Plexation of a compound, plexand, dissolved in an anti-plex such as a branched chain hydrocarbon solvent, with a saturated urea solution proceeds until the concentration of the plexand is reduced to a certain minimum concentration which may be termed the "equilibrium concentration." In general, the "equilibrium concentration" is lower, the lower the temperature of plexation and is dependent only upon the temperature and not upon the solvent for the plexand, provided the urea solution is maintained saturated with urea and provided the plexand-solvent phase can be regarded as an ideal solution.

Equilibrium values were determined for a number of compounds by agitating solutions of varying concentrations of the substituted hydrocarbon in iso-octane with a 70% methanol −30% water solution saturated with urea and noting the minimum concentration required for plexad formation. The results are summarized in Table VI, below.

TABLE VI.—EQUILIBRIUM VALUES

| Group | Structure | Equilibrium Conc., Vol. Percent | Temp., °C. |
|---|---|---|---|
| | *Terminal Substituent* | | |
| COOH | $H_3C(CH_2)_6COOH$ | 4.0 | 25 |
| OH | $H_3C(CH_2)_6CH_2OH$ | 6.0±1 | 27 |
| $CH_2OH$ | $H_3C(CH_2)_6CH_2OH$ | 6.0±1 | 27 |
| Cl | $H_3C(CH_2)_6CH_2Cl$ | 13.7 | 25 |
| Br | $H_3C(CH_2)_6CH_2Br$ | 10.4±1 | 31 |
| $CH_3$ | $H_3C(CH_2)_6CH_3$ | 32 | 25 |
| | *Non-Terminal Substituent* | | |
| COOH | $H_3C\ CH_2\ CH(CH_2)_3CH_3$ | No Plexad | 25 |
| OH | $H_3C\ CH(CH_2)_5CH_3$ with COOH | 43.0±1.5 | 27 |
| $CH_2OH$ | $H_3C\ CH_2CH(CH_2)_3CH_3$ with OH | No Plexad | 25 |
| Cl | $H_3C\ CH(CH_2)_5CH_3$ with $CH_2OH$ | do | 25 |
| Br | $H_3C\ CH(CH_2)_5CH_3$ with Br | do | 30 |

From the data shown in Table VI, it will be noted that, in all cases, the terminally-substituted compound, (A), forms the stronger plexad, while only one of the illustrative non-terminally-substituted compounds, (B), forms a plexad. In those cases where the compound (B) does not form a plexad, relatively sharp separation may be obtained between it and another compound (B) capable of plexad formation, in a single plexation.

(a) *Separation of n-octane and n-octene-1*

The following solution was contacted with urea, in a reaction vessel: a mixture of equal parts by volume of n-octane and n-octene-1 was contacted at 25° C. with five parts, by volume, of 70 per cent aqueous methanol saturated with urea. A plexad was formed and the mixture was centrifuged. The upper layer was decanted off and the composition thereof was determined by refractive index measurement, which indicated that the residue was richer in n-octene-1 than the original solution.

The plexad was decomposed with water to urea and plexand. The recovered plexand was analyzed for n-octane and n-octene-1 by refractive index. The latter measurement revealed that this residue contained a greater concentration of n-octane than did the original solution.

This application is a continuation-in-part of application Serial No. 4997, filed January 29, 1948. Halogen compounds can be plexated from mixtures containing the same and form urea plexads, as described above and as described and claimed in application Serial No. 115,511, now abandoned. Application Serial No. 374,707, filed August 17, 1953, is a continuation of application Serial No. 115,511. Compounds characterized by a nitrogen-containing substituent are also plexated from mixtures containing the same and form plexads with urea, as described above; this subject matter is also described and is claimed in application Serial No. 115,515. Application Serial No. 407,197 was filed February 1, 1954, as a division of the last-mentioned application. Sulfur-containing compounds are also plexated from their mixtures, and form plexads with urea, as described above and as described and claimed in application Serial No. 255,943, filed November 13, 1951, as a continuation of application Serial No. 115,516, which has been abandoned. Plexation of compounds containing cyclic substituents, and urea plexads thereof, are described and are claimed in application Serial No. 116,593.

Urea plexation of a non-terminally mono-substituted compound from mixtures containing the same and a non-terminally poly-substituted compound is described and is claimed in application Serial No. 115,513, now U. S. Patent 2,642,422. Urea plexation of mixtures containing aliphatic compounds of different degrees of unsaturation is described and is claimed in application Serial No. 115,514; similarly, plexation of mixtures containing aliphatic hydrocarbons of different degrees of unsaturation and urea plexads of such hydrocarbons, are described and are claimed in Serial No. 115,518, now U. S. Patent No. 2,642,423, and in divisional application thereof Serial No. 266,547, filed January 15, 1952. Application Serial No. 410,573, filed February 16, 1954, is a division of application Serial No. 266,547, filed January 15, 1952, which, in turn, is a division of said application Serial No. 115,518 (now Patent No. 2,642,423).

Said applications Serial Nos. 115,511; 115,513; 115,515; 115,516; 115,518 and 116,593 were filed concurrently with this application on September 13, 1949.

I claim:

1. The method for selectively separating a straight chain compound represented by general Formula A:

(A)          $X(CH_2)_nCH_3$ wherein X is a monovalent group and $n$ is a whole number, said compound (A) being selected from the group consisting of: one in which $n$ is greater than about 4 to 6 and in which the "width" of X is less than about 2.3 A°, one in which $n$ is greater than about 6 to 10 and in which the "width" of X is between about 2.3 A° and about 3.7 A°, one in which $n$ is greater than about 10 to 16 and in which the "width" of X is between about 3.7 A° and about 5.2 A°, and one in which $n$ is greater than about 16 and in which the "width" of X is greater than about 5.2 A°, from a mixture consisting essentially of said compound (A) and at least one straight chain compound represented by general Formula B:

(B) $\quad X'(CH_2)_nCH_3$ wherein X' is a different monovalent group of greater "width" than X, and n is the same as in (A), which comprises: contacting said mixture with urea under conditions appropriate for the formation of a crystalline complex of urea and said compound (A), whereby said compound (A) preferentially forms a crystalline complex with urea; and separating said complex from the mixture thus formed.

2. The method for selectively separating a straight chain compound represented by general Formula A:

(A) $\quad X(CH_2)_nCH_3$ wherein X is a monovalent group and n is a whole number, said compound (A) being selected from the group consisting of: one in which n is greater than about 4 to 6 and in which the "width" of X is less than about 2.3 A°, one in which n is greater than about 6 to 10 and in which the "width" of X is between about 2.3 A° and about 3.7 A°, one in which n is greater than about 10 to 16 and in which the "width" of X is between about 3.7 A° and about 5.2 A° and one in which n is greater than about 16 and in which the "width" of X is greater than about 5.2 A°, from a mixture consisting essentially of said compound (A) and at least one straight chain compound represented by general Formula B, (B) $\quad X'(CH_2)_sCH_3$ wherein X' is a different monovalent group of substantially equal "width" as X, and s is a whole number less than n, which comprises: contacting said mixture with urea under conditions appropriate for the formation of a crystalline complex of urea and said compound (A), whereby said compound (A) preferentially forms a crystalline complex with urea; and separating said complex from the mixture thus formed.

3. The method defined by claim 2 wherein compounds (A) and (B) are saturated compounds.

4. The method for selectively separating a straight chain compound represented by general Formula C:

(C) $\quad H_3C(CH_2)_rCH(CH_2)_mCH_3$
$\qquad\qquad\qquad\qquad |$
$\qquad\qquad\qquad\qquad X$ wherein X is a monovalent group, and r and m are integers the sum of which is equal to n–2, and wherein n is a whole number, said compound (C) being selected from the group consisting of: one in which n is greater than about 6 to 8 and in which the "length" of X is less than about 2.3 A°, one in which n is greater than about 9 to 12 and in which the "length" of X is between about 2.3 A° and about 2.5 A°, one in which n is greater than about 12 to 17 and in which the "length" of X is between about 2.5 A° and about 2.8 A°, one in which n is greater than about 17 to 23 and in which the "length" of X is between about 2.8 A° and about 3.2 A°, and one in which n is greater than about 23 and in which the "length" of X is greater than about 3.2 A°, from a mixture consisting essentially of said compound (C) and at least one straight chain compound represented by general Formula C':

(C') $\quad H_3C(CH_2)_rCH(CH_2)_mCH_3$
$\qquad\qquad\qquad\qquad |$
$\qquad\qquad\qquad\qquad X'$ wherein r and m are the same as in (C), and X' is a different monovalent group of greater "length" than X, which comprises: contacting said mixture with urea under conditions appropriate for the formation of a crystalline complex of urea and said compound (C), whereby said compound (C) preferentially forms a crystalline complex with urea; and separating said complex from the mixture thus formed.

5. The method for selectively separating a straight chain compound represented by general Formula C:

(C) $\quad H_3C(CH_2)_rCH(CH_2)_mCH_3$
$\qquad\qquad\qquad\qquad |$
$\qquad\qquad\qquad\qquad X$ wherein X is a monovalent group, and r and m are integers the sum of which is equal to n–2, and wherein n is a whole number, said compound (C) being selected from the group consisting of: one in which n is greater than about 6 to 8 and in which the "length" of X is less than about 2.3 A°, one in which n is greater than about 9 to 12 and in which the "length" of X is between about 2.3 A° and about 2.5 A°, one in which n is greater than about 12 to 17 and in which the "length" of X is between about 2.5 A° and about 2.8 A°, one in which n is greater than about 17 to 23 and in which the "length" of X is between about 2.8 A° and about 3.2 A°, and one in which n is greater than about 23 and in which the "length" of X is greater than about 3.2 A°, from a mixture consisting essentially of said compound (C) and at least one straight chain compound represented by general Formula D:

(D) $\quad H_3C(CH_2)_aCH(CH_2)_bCH_3$
$\qquad\qquad\qquad\qquad |$
$\qquad\qquad\qquad\qquad X'$ wherein a and b are integers the sum of which is less than the sum of r and m, and X' is a different monovalent group of greater "length" than X, which comprises: contacting said mixture with urea under conditions appropriate for the formation of a crystalline complex of urea and said compound (C), whereby said compound (C) preferentially forms a complex with urea; and separating said complex from the mixture thus formed.

6. The method for selectively separating a straight chain compound (III) containing a substituent joined to other than a terminal carbon atom thereof, said compound (III) being selected from the group consisting of: one having in the chain at least about 7 to 10 carbon atoms and said substituent having a "length" less than about 2.3 A°, one having in the chain at least about 10 to 13 carbon atoms and said substituent having a "length" between about 2.3 A° and about 2.5 A°, one having in the chain at least about 18 to 24 carbon atoms and said substituent having a "length" between about 2.8 A° and about 3.2 A° and one having in the chain at least about 24 carbon atoms and said substituent having a "length" greater than about 3.2 A°, from a mixture consisting essentially of said compound (III) and at least one isomer (IV) thereof in which isomer the substituent is joined to a more centrally positioned carbon atom of the chain, which comprises: contacting said mixture with urea under conditions appropriate for the formation of a crystalline complex of urea and said compound (III), whereby said compound (III) preferentially forms a crystalline complex with urea; and separating said complex from the mixture thus formed.

7. The method for selectively separating a straight chain saturated compound represented by general Formula A:

(A)    $X(CH_2)_nCH_3$ wherein X is a monovalent group and $n$ is a whole number, said compound (A) being selected from the group consisting of: one in which $n$ is greater than about 4 to 6 and in which the "width" of X is less than about 2.3 A°, one in which $n$ is greater than about 6 to 10 and in which the "width" of X is between about 2.3 A° and about 3.7 A°, one in which $n$ is greater than about 10 to 16 and in which the "width" of X is between about 3.7 A° and about 5.2 A° and one in which $n$ is greater than about 16 and in which the "width" of X is greater than about 5.2 A°, from a mixture consisting essentially of said compound (A) and at least one straight chain saturated compound (B), (B)    $X'(CH_2)_nCH_3$ wherein X' is a different monovalent group of substantially equal "width" as X, and $n$ is the same whole number as in compound (A), the melting point of compound (B) being higher than that of compound (A), which comprises: contacting said mixture with urea under conditions appropriate for the formation of a crystalline complex of urea and said compound (A), whereby said compound (A) preferentially forms a crystalline complex with urea; and separating said complex from the mixture thus formed.

References Cited in the file of this patent

UNITED STATES PATENTS

| Number | Name | Date |
|---|---|---|
| 2,116,640 | Quehl | May 10, 1938 |
| 2,275,809 | Roberts | Mar. 10, 1942 |
| 2,300,134 | Priewe | Oct. 27, 1942 |
| 2,346,632 | Wolfert | Apr. 11, 1944 |
| 2,376,008 | Riethof | May 15, 1945 |
| 2,520,715 | Fetterly | Aug. 29, 1950 |
| 2,520,716 | Fetterly | Aug. 29, 1950 |
| 2,549,372 | Fetterly | Apr. 17, 1951 |
| 2,557,257 | Melrose | June 19, 1951 |
| 2,596,344 | Newey et al. | May 13, 1952 |

FOREIGN PATENTS

| Number | Country | Date |
|---|---|---|
| 443,795 | Great Britain | Mar. 6, 1936 |

OTHER REFERENCES

Matignon, "Bull. Soc. Chim. Paris," vol. 37 (1894), p. 575.

Baum, "Ber deut Chem.," vol. 41 (1908) p. 523.

Bengen, Reel 143 T. O. M. May 22, 1946, pp. 135 to 139. (Deposited Library of Congress.)

Powell, Chem. Soc. Journal, 1948, part 1, pp. 61 to 73.

Schlenk, Jr. Angew, Chem., 1949, Nr. 11, p. 447.

Bengen et al., "Experimentia," vol. 5, May, 1949, p. 200.